United States Patent
Anderson

(10) Patent No.: US 9,405,039 B2
(45) Date of Patent: Aug. 2, 2016

(54) GROUND ENGAGING MEMBER ACCUMULATION DETERMINATION

(71) Applicant: Deere and Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 14/259,104

(22) Filed: Apr. 22, 2014

(65) Prior Publication Data
US 2015/0296701 A1    Oct. 22, 2015

(51) Int. Cl.
*A01B 71/08*    (2006.01)
*G01V 11/00*    (2006.01)
*A01B 79/00*    (2006.01)

(52) U.S. Cl.
CPC ............. *G01V 11/002* (2013.01); *A01B 71/08* (2013.01); *A01B 79/00* (2013.01)

(58) Field of Classification Search
CPC ....... A01B 63/002; A01B 76/00; A01B 71/08
See application file for complete search history.

(56) References Cited

U.S. PATENT DOCUMENTS

| | | | |
|---|---|---|---|
| 4,677,542 A * | 6/1987 | Kasten | A01B 63/1117 172/9 |
| 4,918,441 A | 4/1990 | Bohman | |
| 5,321,939 A | 6/1994 | Fuse et al. | |
| 5,650,609 A | 7/1997 | Mertins et al. | |
| 2001/0039190 A1* | 11/2001 | Bhatnagar | D06F 39/005 455/450 |
| 2006/0217993 A1 | 9/2006 | Anderson | |
| 2007/0061053 A1 | 3/2007 | Zeitzew | |
| 2009/0003072 A1 | 1/2009 | Hwang et al. | |
| 2009/0090032 A1* | 4/2009 | Yang | E01H 5/066 37/324 |
| 2009/0187315 A1* | 7/2009 | Yegerlehner | A01B 63/1117 701/50 |
| 2012/0095652 A1 | 4/2012 | Anderson | |
| 2012/0239260 A1* | 9/2012 | Ishikawa | A01B 63/1145 701/50 |
| 2012/0245795 A1* | 9/2012 | Matsuzaki | B60G 9/02 701/38 |
| 2013/0180742 A1* | 7/2013 | Wendte | A01B 63/008 172/4 |
| 2014/0212222 A1* | 7/2014 | Trottier | E02F 3/961 405/184.1 |

FOREIGN PATENT DOCUMENTS

DE         10349321      5/2005
JP         2001299091    10/2001

OTHER PUBLICATIONS

Blocked Head Monitors, (Feb. 11, 2014) http://ag.topconpositioning.com/ag-products/additional-products-australia-only/blocked-head-monitors.
IAS Wireless Blockage Monitor, Midwest Producer, Sep. 26, 2011 http://www.midwestproducer.com/news/new_products/ias-wireless-blockage-monitor/article_20f559a4-e84e-11e0-8b2d-001cc4c002e0.html.
http://www.agritechnica.com/1390.html?&tx_ttnews%5Btt_news%5D=449&cHash=04e4c832592352349ff3b6042f233301 (Feb. 11, 2014).

* cited by examiner

*Primary Examiner* — Robert Pezzuto
*Assistant Examiner* — Adam Behrens
(74) *Attorney, Agent, or Firm* — Rathe Lindenbaum LLP

(57) ABSTRACT

A sensor to be mounted to an implement senses a region proximate a flow by ground engaging member of the implement. A electronics receives signals from the sensor and identifies accumulation on the grounding engaging member based upon the signals. The electronics outputs signals based upon the identified accumulation.

20 Claims, 7 Drawing Sheets

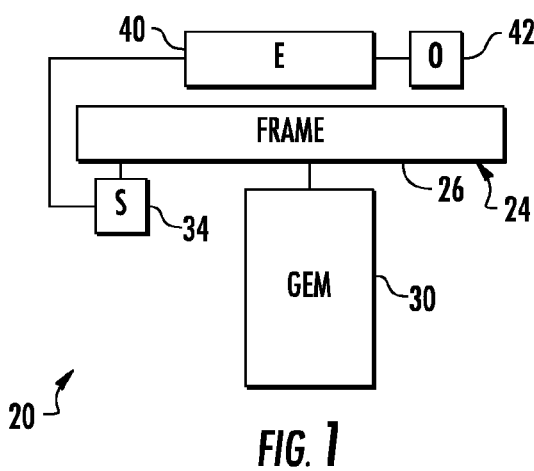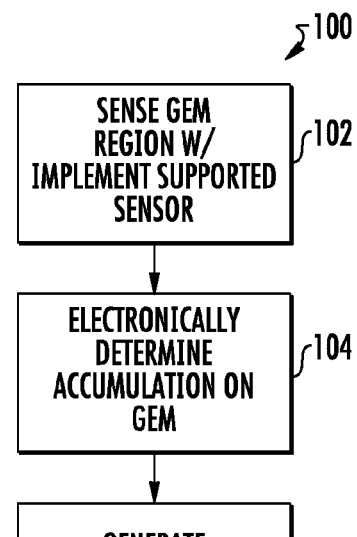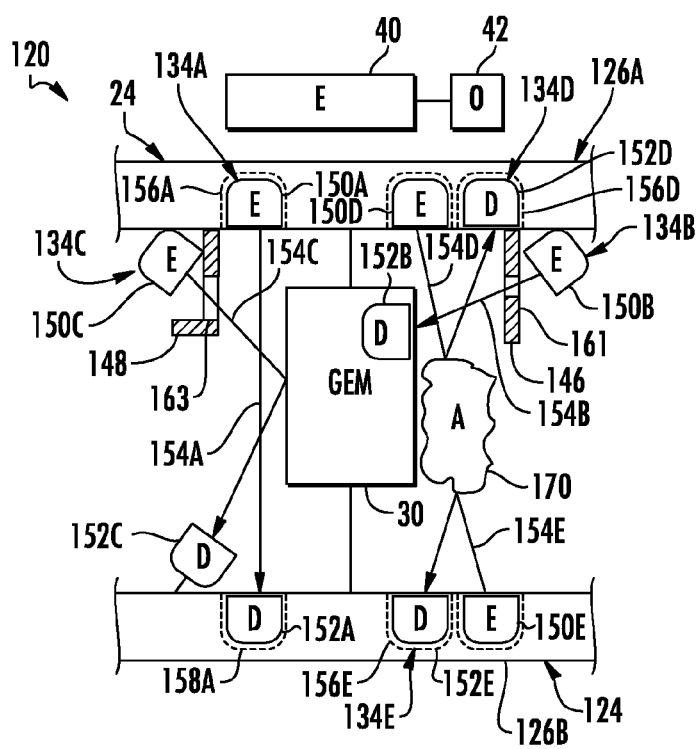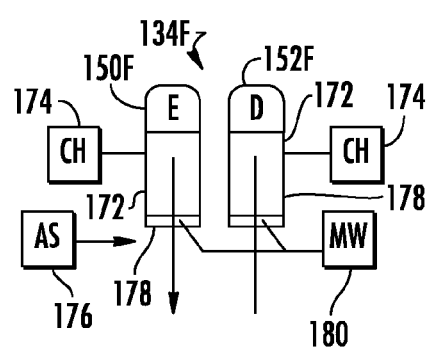

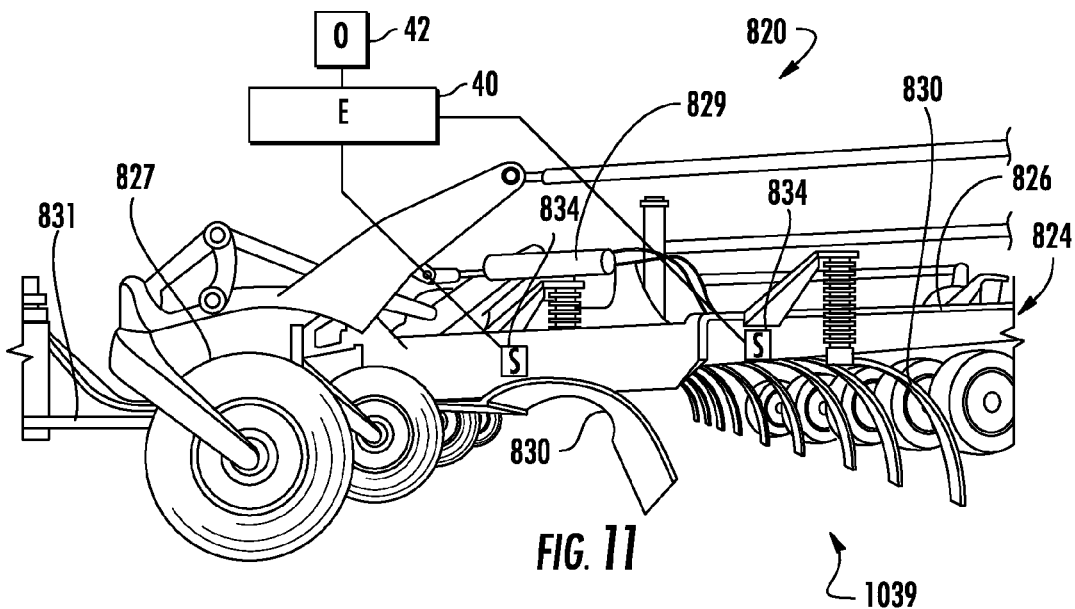
FIG. 11
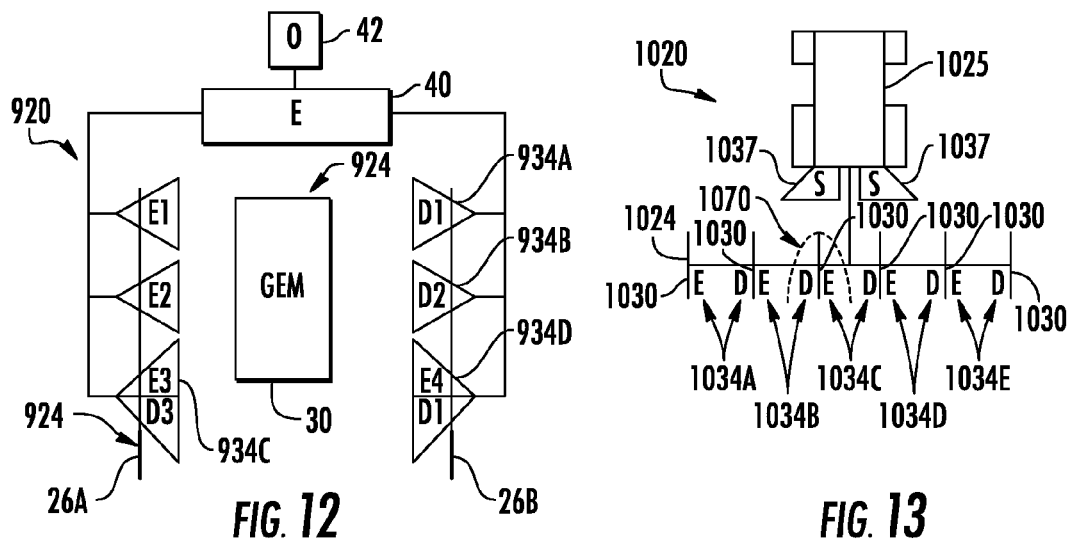
FIG. 12
FIG. 13

GROUND ENGAGING MEMBER ACCUMULATION DETERMINATION

BACKGROUND

During many agricultural operations, such as tillage, planting, and spraying, ground engaging members contact and interact with the soil. During such operations, the soil as well as residue or trash residing in or on the soil may accumulate on the ground engaging members. This accumulation may undesirably impact the operation being carried out, may impact future operations and may damage the ground engaging members or the implement providing such ground engaging members.

BRIEF DESCRIPTION OF THE DRAWINGS

FIG. 1 is a schematic diagram illustrating an example ground engaging member accumulation determination system.

FIG. 2 is a flow diagram of an example method for determining ground engaging member accumulation.

FIG. 3 is a schematic diagram illustrating another example ground engaging member accumulation determination system.

FIG. 4 is a schematic diagram illustrating an example emitter-detector pair.

FIG. 11 is a schematic diagram illustrating another example ground engaging member accumulation determination system utilized with respect to another example implement.

FIG. 12 is a schematic diagram illustrating another example ground engaging member accumulation determination system.

FIG. 13 is a schematic diagram illustrating another example ground engaging member accumulation determination system.

DETAILED DESCRIPTION OF THE EXAMPLE EMBODIMENTS

Figure 5:
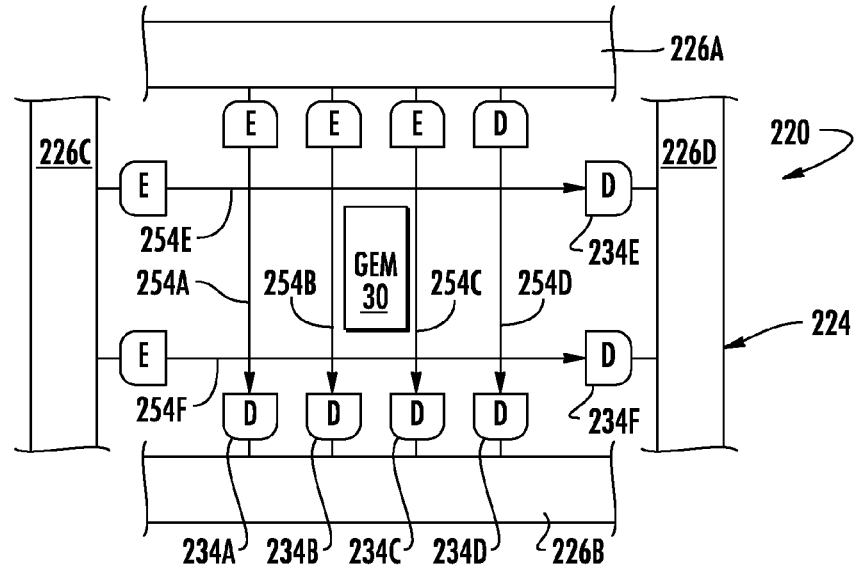
FIG. 5 is a schematic diagram illustrating another example ground engaging member accumulation determination system.

FIG. 1 schematically illustrates an example ground engaging member accumulation determination system 20. Ground engaging member accumulation determination system 20 senses and determines the build up or accumulation of soil, residue or trash on and about flow by ground engaging members to facilitate an appropriate response to such accumulation. Ground engaging accumulation determination system 20 is for use with an implement having one or more flow by ground engaging members. Examples of implements having flow by ground engaging members for which system 20 may be utilized, include but are not limited to, mold board plows, chisel plows, cultivators, discs, harrows, planters, seeders, fertilizer, manure, herbicide, insecticide or other knifing/injecting implements and the like. Such implements are pulled, pushed or carried by a vehicle such as a tractor or the like.

In one example, a flow by ground engaging member is a member configured or designed so as to move soil, residue and/or trash without accumulation of the soil, residue or trash upon the ground engaging member. In some implementations, such flow by ground engaging members separate or part the soil, residue and/or trash. In other implementations, such flow by ground engaging members temporarily shift and re-shift the soil, residue and/or trash. In contrast to construction buckets and the like, flow by ground engaging members are configured to avoid accumulation or gathering of the material being engaged.

In the example illustrated, system 20 is schematically illustrated as being utilized with an implement 24 comprising a frame 26 and a ground engaging member (GEM) 30. Frame 26 comprises an arrangement of beams, brackets or other structures supporting and carrying ground engaging member 30 and facilitating engagement of ground engaging member 30 with the underlying soil. Although not illustrated, in one implementation, frame 26 is movably supported by one or more wheels or tires. In one implementation, frame 26 comprise a hitch facilitating the pulling a frame 26 by a vehicle, such as a tractor. In other implementations, depending upon the particular implement, frame 26 may alternatively be configured to be pushed by vehicle or may be mounted to/suspended by a vehicle.

Ground engaging member 30 comprises a member configured to engage the underlying soil. Ground engaging member 30 interacts with the soil by cutting into the soil and/or turning the soil in a particular fashion. Examples of ground engaging member 30, depending upon the implement 24, include but are not limited to, plow blades, disk blades, tines, shovels, coulters, knives and the like. As noted above, during engagement with the underlying grounder soil, ground engaging member 30 experiences accumulation of soil, residue or trash. Such residue includes stalk, stubble or remaining plant material from a prior crop. Trash may be organic or inorganic.

Ground engaging member accumulation determination system 20 senses and determines the presence of accumulation upon ground engaging member 30, producing output and facilitating a response to such accumulation, when needed. As schematically shown by FIG. 1, ground engaging member accumulation system 20 comprises sensor 34, electronics 40 and output device 42. Sensor 34 comprises one or more sensing devices mounted to frame 26 or other portions of implement 24 to sense a region or volume proximate ground engaging member 30 where accumulation is expected to occur.

In one implementation, sensor 34 comprises one or more emitter-detector pairs. In one implementation, such emitter-detector pairs extend on opposite sides of the region or volume being monitored such that when material or accumulation is absent, the beam travels from the emitter/transceiver to the detector/receiver and when material accumulation gets in the way, the beam is attenuated or blocked. In another implementation, such emitter-detector pairs are located on the same side or ends of the region or volume being monitored. When material or accumulation is absent, the beam travels away from the emitter and does not get reflected at any detected signal level. Alternatively, if accumulation exists in the monitored area, a significant fraction of the beam is reflected or backscattered and detected by the detector/receiver. In yet another implementation, the emitter-detector pair are on opposite ends region or volume being monitored, wherein a portion of the emitted signal continuously reaches the detector, but the portion reaching the detector is inversely proportional to the amount of blocking accumulation of material between the emitter and the detector.

In one implementation, sensor 34 comprises an infrared emitter-detector pair. In another implementation, sensor 34 comprises a visible light emitter-detector pair. In another implementation, sensor 34 comprises a Gamma ray Gamma ray emitter-detector pair. In yet other implementations, sensor 34 comprises plurality of different types of sensors focusing upon or monitoring the same region of ground engaging member 30. For example, in one implementation, sensor 34 may comprise both an infrared emitter-detector pair and a Gamma ray emitter-detector pair, wherein the infrared emitter-detector pair provides precise blockage information in obscured environments while the Gamma ray emitter detector pair provides precise blockage information in a greater range of environments where there may be greater obscurants. Examples of obscurants include dust and other particles which might interfere with the emission and/or detection of electromagnetic beams.

Electronics 40 comprise electronic circuitry such as a processing unit and/or application-specific integrated circuit. Electronics 40 is configured to receive signals from sensor 34 and to identify accumulation on ground engaging member 30 based upon such signals. Electronics 40 is further configured to generate output signals based upon the identified accumulation. Such output signals are transmitted to output device 42.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, a processing unit may be embodied as part of one or more application-specific integrated circuits (ASICs). Unless otherwise specifically noted, the electronics 40 is not limited to any specific combination of hardware circuitry and software, nor to any particular source for the instructions executed by the processing unit.

For purposes of this disclosure, the phrase "configured to" denotes an actual state of configuration that fundamentally ties the stated function/use to the physical characteristics of the feature proceeding the phrase "configured to". For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Signals provided to electronics 40 by sensor 34 indicate material build or material flow through tillage implement 24. In one implementation, electronics 40 analyze such signals to determine the frequency of emitter/detector beam interruption, the percent of time that a beam is interrupted, a number of beams being interrupted, a function of signal attenuation and/or a periodicity of blockage, such as if the blocking or accumulating material is rotating and what is the period of rotation. Electronics 40 utilizes such accumulation data to output action or control signals to one or more output devices 42.

Output device 42 comprises one or more devices in communication with electronics 40 which react to control signals generated by electronics 40 by which actions or responses are made based upon a determined identified accumulation upon ground engaging member 30. In one implementation, output device is carried by implement 24 to receive signals from electronics 40 in a wired or wireless fashion. In yet another implementation, output device 24 is carried by the vehicle, such as a tractor, pulling, pushing or carrying implement 24, wherein output device 24 receives signals from electronics 40 carried upon implement 24 in a wired or wireless fashion. In another implementation, output device 24 is a mobile device or computer associated with a person at a remote location.

In one implementation, output device 42 comprises an actuator configured to adjust an operational characteristic or parameter of implement 24 based upon the determined accumulation. For example, in one implementation, output device 24 comprises a controller and one or more hydraulic and/or pneumatic piston-cylinder assemblies which selectively raise and lower ground engaging member 30 in response to signals from electronics 40 indicating accumulation upon ground engaging member 30. In one implementation, output device 42 may additionally or alternatively rotate or adjust an angular position of ground engaging member 30 in response to a determined accumulation upon or adjacent to ground engaging member 30. In yet another implementation, device 42 comprises an actuator which moves a sharpening device into and out of engagement with the ground engaging member to sharpen the blade, knife, coulter or the like. In yet another implementation, device 42 comprises a battery of exchangeable ground engaging members, wherein device 42 automatically exchanges in existing ground engaging member with a new ground engaging member based upon such actions signals from electronics 40. In one implementation, output device 42 comprises an actuator to adjust the angle or orientation of ground engaging member 30. For example, output device 42 may adjust the angle of a leading disk or coulter to be more parallel with the direction of travel, providing more direct cutting action with encountered stalks.

In another implementation, output device 42 additionally or alternatively comprise a controller in communication with an engine, motor and/or transmission, wherein the controller outputs control signals based upon signals being output from electronics 40 which are based on the sensed accumulation and wherein the control signals adjust the operation of the vehicle pulling, pushing or carrying implement 24. For example, in one implementation, output device 42 automatically, without user intervention, causes the vehicle to temporarily slow down or speed up in response to a determined accumulation or lack thereof.

In one implementation, output device 42 comprises a display or other notification device to alert an operator of the presence of accumulation or notify the operator of an extent or degree of accumulation. In such an implementation, output device 42, in response to signals from electronics 40, may further visibly, haptically, or audibly present a recommendation or suggested response. For example, based upon signals from electronics 40 indicating a degree of accumulation, output device 42 produces output in the form of a notification to the operator of such accumulation and further presents a recommendation to the operator that the operating height of ground engaging member 30 be raised or that a particular ground engaging member is sharpened, adjusted or replaced. In another example, output device 42 provides a recommendation that the implement be stopped and that the accumulation be manually removed.

In yet another implementation, output device 42 additionally or alternatively comprises a mapping device and persistent storage device or memory device. In such an implementation, output device 42 receives signals from electronics 40 indicating points in time at which accumulation on ground engaging member 30 was identified, wherein output device 42 further correlates such times to particular geographic locations, such as particular points for locations in a field to create located geo-referenced data. For example, device 42 may comprise a geo-referencing device, such as a device which receives signals from a global positioning system or global navigation satellite system, wherein the particular time at which accumulation is identified is linked to the particular geographic location of ground engaging member 30 at the time that the accumulation occurred. In other words, output device 42 ties the detected buildup of material or accumulations to a particular ground location through geo-referencing. In one implementation, output device 42 additionally or alternatively generates located phyto-referenced data by tying the detected buildup of material or accumulations on ground engaging member 30 to a particular plant or set of plants. Such located accumulation data, whether geo-referenced or phyto-referenced, is used by other output devices 42 to make agronomic decisions and machinery control settings. The location part of located data is further used to access and retrieve historical information about a given place or plant. In one implementation, the location and the data regarding the determined accumulation, extent or type of accumulation, for ground engaging member 30 are stored for subsequent use during field or crop management.

In one implementation, output device 42 may automatically retrieve, link/associate and store other parameters, in addition to geographic location, to the identified accumulation. For example, output device 42 may retrieve other sensed parameters at the time of the accumulation. Examples such parameters include, but are not limited to, the time of day; environmental conditions such as the current air/soil temperature, and/or the current humidity; current soil moisture level; and/or the current operational settings of the implement and/or vehicle at the time of the accumulation. Examples of operational settings of an implement include the operational height of ground engaging member 30 and/or the speed of the vehicle pushing, pulling or carrying implement 24. Such stored data may indicate that accumulations more frequently occurred at a particular time of day, when implement 24 was operated at particular air temperatures or at particular soil temperatures, at particular humidities or under certain operational parameters such as a certain ground engaging member depths or at certain speeds. Such factors may vary from one field to another or from location to location in a field.

In one implementation, using such stored data, an operator or processor makes adjustments for future use of ground engaging member 30. For example, in one implementation, electronics 40, or another processing device, may evaluate such stored data to determine when accumulation is more likely to occur at particular air, vegetation or soil conditions. Conditions comprise without limitation temperature, humidity, soil moisture level, vegetative matter moisture level, or under certain operational parameters. During such times, electronics 40 may adjust the operational parameters of implement 24 and/or the vehicle providing mobility to implement 24 to account for the particular air temperature or humidity and/or soil moisture to reduce a likelihood of accumulation. Alternatively, electronics 40 outputs a notification to an operator or manager recommending use of ground engaging member 30 at particular times based upon a processor retrieved weather forecast, such particular times expected to have associated temperature and humidity values that may be more favorable for reducing accumulation.

In one implementation, output device 42 additionally or alternatively retrieves, link/associates and stores parameters relating to the location at which the accumulation occurred. Examples of such parameters include, but are not limited to the type of soil at a location in the field, the current or prior crop variety for the location the field in which the accumulation occurred, and the planting density at the location at which the accumulation occurred. Such additional parameters are also stored in a persistent storage device or memory device for subsequent use in crop and field management. In one implementation, output device 42 generates map of historical accumulation locations identifying what geographic locations areas of the field are more or less likely to produce accumulations when interacting with high ground engaging member 30 at one or more particular environmental or operational parameters. Such a map represents historical accumulation data linked to geographic locations. In one implementation electronics 40 utilizes such a map to adjust operational parameters of one or more of ground engaging member 30, implement 26 and/or the associated vehicle. For example, during subsequent operations, the current location of ground engaging member 30 is sensed or tracked by electronics 40 or another computing device using signals from a global positioning system or other geo-referencing data source. As ground engaging member 30 is about to interact with soil at a forthcoming location, electronics 40 consults the stored historical map and utilizes such data to generate control signals adjusting the operational settings of ground engaging member 30 and/or the vehicle providing mobility to ground engaging member 30 to account for the unique characteristics of the current or forthcoming location so as to reduce accumulation.

In yet another implementation, electronics 40, or another computing device, generates a map of different operational settings for ground engaging member 30, implement 24 and the associated vehicle for different locations using historical stored data or prior accumulations. In one implementation, output device 42 displays an operational control map or computer readable digital control script, allowing an operator or manager to make adjustments to such operational parameters as ground engaging member 30 traverses such different locations on the map. In yet another implementation, output device 42 utilizes and consults the stored map to automatically, without user intervention, adjust one or more of the operational parameters of ground engaging member 30, implement 24 or the associated vehicle as ground engaging member 30 traverses a geographic location. For example, the stored map may comprise two regions, wherein ground engaging member 30 is to be at a first depth in a first region and a second depth in a second region. In such an example, when ground engaging member 30 passes from the first region to the second region, as determined by geo-referencing signals from a global positioning system or other geo-referencing data source, electronics 40 or another computing device automatically outputs control signals causing one or more actuators to raise or lower ground engaging member 30 from the first depth to the second depth. Such adjustments are continuously made as ground engaging member 30 is moved to different positions corresponding to different locations in the operational control map.

FIG. 2 is a flow diagram of an example method 100 for determining ground engaging member accumulation and utilizing the determined accumulation. Method 100 may be carried out by system 20 shown and described with respect to FIG. 1. As indicated by block 102, a region or volume adjacent to a ground engaging member 30 is sensed using an implement supported sensor. Because the sensor is supported by an implement, such as implement 24, the sensor is more closely situated proximate to ground engaging member 30. In one implementation, the sensor senses accumulation for an individual ground engaging member, rather than multiple ground engaging members, providing enhanced accumulation mapping resolution. For example, in one implementation, implement 24 may include ground engaging members arranged in rows. Because the sensor, such as sensor 34, is on implement 24, the sensor is better able to provide precise accumulation data on a row-by-row basis resolution. In yet other implementations, the sensor may capture data for a plurality of ground engaging members 30 or a portion of implement 24.

As indicated by block 104, electronics 40 electronically determines the presence of accumulation and/or, possibly, the degree of accumulation on ground engaging member 30 using signals received from sensor 34. In one implementation, electronics 40 utilizes such signals to determine what portion of ground engaging member 30, front, rear, left side, right side, etc. are experiencing accumulation. In yet another implementation, electronics 40 utilizes such signals to determine a size of such accumulation or the extent to which one or more surfaces of ground engaging member 30 are experiencing accumulation. In one implementation, electronics 40 utilizes such signals to determine a density of the accumulation upon ground engaging member 30. In yet another implementation, electronics 40 utilizes such signals to determine a length of time at which the accumulation remained adhered to ground engaging member 30 before separating.

As indicated by block 106, electronics 40, based upon such determinations regarding accumulation, generates output signals which are transmitted to output device 42 to generate actions or output based upon the determined accumulation. As noted above, such output may be in the form of: (1) the adjustment of operational parameters of the individual ground engaging member 30; (2) the adjustment of operational parameters of implement 24; (3) the adjustment of operational parameters of the vehicle providing mobility to implement 24; (4) the output of an audible, haptic, or visible notification or alert to an operator or manager of the present of accumulation while the accumulation is occurring or the degree or extent of the accumulation when the accumulation is occurring; (5) the output of a recommended response to the operator or manager based upon the determined accumulation; (6) the retrieval, linkage/association and storage of other data to the accumulation data, whether the other data be environmental data, operational parameter data or location-based data; (7) the generation, storage and subsequent use of a map associating identified accumulations to particular geographic locations to adjust subsequent operational parameters, either manually by an operator/manager or automatically by a computing device controller; and/or (8) the generation, storage and subsequent use of a map/script associating recommended operational parameters for the ground engaging member, implement and/or associated vehicle to particular geographic locations based upon the accumulation data to facilitate the adjustment of subsequent operational parameters, either manually by an operator/manager or automatically by a computing device controller. In addition to facilitating manual or automatic adjustment of operational parameters of ground engaging member 30, the associate implement 24 and/or the associated vehicle providing mobility to the implement 24, such accumulation maps may further be utilized to facilitate adjustment of other field or crop operations with other implement having other types of ground engaging members or implements that may not have ground engaging members. For example, in one implementation, the generated maps of accumulation data are consulted by a manager and/or processor to facilitate adjustment of operational parameters of implements or vehicles during such operations as planting, applying fertilizer, applying herbicide/insecticide or harvesting. The generated maps may further assist in making management decisions regarding irrigation, crop rotation, till/no till operations and the like.

FIG. 3 is a schematic diagram of ground engaging member accumulation determination system 120, an example implementation of ground engaging member accumulation determination system 20. System 120 is similar to system 20 except that system 120 is illustrated as being employed with implement 124 comprising frame portions 126A and 126B (collectively referred to as frame portions 126) and that system 120 is specifically illustrated as comprising shields 146, 148 and emitter-detector pairs 134A, 134B, 134C, 134D and 134E (collectively referred to as emitter-detector pairs 134). Those remaining components of system 120 which correspond to components of system 20 are numbered similarly.

Implement 124 is similar to implement 24. Implement 124 comprises an implement to be releasably coupled to a vehicle, such as a tractor. In one implementation, implement 124 comprise a hitch, facilitating the pulling of implement 124 by a vehicle, such as a tractor. Frame portions 126A and 126B are similar to frame 26. Frame portions 126 extend on opposite sides or portions of ground engaging member 30, facilitating location of sensors 134 or portions of one of sensors 134 on opposite sides of or about ground engaging member 30.

Shields 146, 148 comprise structures extending from frame portion 126A. Shields 146, 148 partially surround or enclose at least portions of one or more of emitter-detector pairs 134. In one implementation, shields 146, 148 are integrally formed as a single unitary body with frame portions 126. In another implementation, shields 146, 148 are welded, mounted to, fastened to or otherwise supported along frame portion 126A or another portion of implement 124. Shields 146, 148 allow the operation of emitter-detector pairs 134B and 134C, respectively, while protecting such emitter-detector pairs 134B and 134C from damage or material blockage. Although illustrated as extending from frame portion 126A for only some of emitter-detector pairs 134, in other implementations, system 120 may comprise similar shields along frame portion 126B and/or for a greater or fewer of such emitter-detector pairs 134.

Emitter-detector pairs 134 comprises one or more sensing devices mounted to frame 26 or other portions of implement 24 to sense a region or volume proximate ground engaging member 30 where accumulation is expected to occur. Emitter-detector pairs 134 each comprise an emitter/transmitter and a detector/receiver. Emitter/transmitter emits a beam which is received by the detector, resulting in a signal being produced. In one implementation, one or more of pairs 134 comprise an infrared emitter-detector pair. In another implementation, one or more pairs 134 comprise a visible light emitter-detector pair. In another implementation, one or more of pairs 134 comprises a gamma ray emitter-detector pair.

Emitter-detector pair 134A comprises emitter 150A and detector 152A. Emitter 150A supported by frame 126A on a first side of ground engaging member 30 while detector 152A is supported by frame portion 126B on an opposite side of ground engaging member 30. In operation, emitter 150A emits a beam 154A which, in the absence of accumulation, passes across or through a volume or region adjacent to ground engaging member 30 and is received by detector 152A, resulting a signal being output to electronics 40. In the example illustrated, emitter 150A is housed or received within a cavity 156A formed within frame portion 126A while detector 152A is housed or received within a cavity 158A formed within frame portion 126B. Frame portion 126A and 126B extend about cavities 156A and 156B so as to shield, partially enclose and protect emitter 150A and detector 152A, respectively. In other implementations, one or both of the emitter and the detector of pair 134A is mounted external to frame portions 126A, 126B.

In one implementation, emitter-detector pair 134A comprises a binary sensor, outputting a binary signal based upon whether the region or volume adjacent to ground engaging member 30 is locked or unlocked, indicating a presence or insufficient presence of accumulation. In another implementation, emitter-detector pair 134A produces or outputs a signal proportional to the amount of or density of accumulation in the region through which beam 154A passes. For example, in one implementation, a portion of the emitted signal or beam from emitter 150A continuously reaches the detector 152B, but the portion reaching the detector is inversely proportional to the amount of blocking accumulation of material between the emitter and the detector.

Emitter-detector pair 134B comprises emitter 150B and detector 152B. Emitter 150B is supported by frame portion 126A external to frame portion 126A. Emitter 150B is positioned, aimed or supported so as to direct a beam 154B through an aperture 161 in shield 146 towards detector 152B. Detector 152B is supported adjacent to or by ground engaging member 30. In one implementation, detector 152B is recessed within a portion of ground engaging member 30 so as to be protected, wherein ground engaging member 30 serves as a shield about detector 152B. Depending upon accumulation associated with ground engaging member 30, detector 152B receives beam 154B and outputs a signal which is received by electronics 40. Although emitter 150B is illustrated as being supported by frame portion 126A while detector 152B is illustrated as being supported by ground engaging member 30, this relationship may be reversed.

Emitter-detector pair 134C comprises emitter 150C and detector 152C. Emitter 150C is supported by frame portion 126A external to frame portion 126A. Emitter 150C is positioned, aimed or supported so as to direct a beam 154C through an aperture 163 in shield 148 towards a portion of ground engaging member 30. In one implementation, aperture 163 may comprise a void or open space. In another implementation, aperture 163 comprises a transparent or translucent pane through which a beam passes, but through which dust, dirt or other debris is not permitted to pass. Detector 152C is supported adjacent to or by frame portion 126B. Depending upon accumulation associated with ground engaging member 30, detector 152C receives beam 154C that is reflected off of ground engaging member 30 or accumulation along ground engaging member 30. Detector 152C outputs a signal which is received by electronics 40. Although emitter 150C is illustrated as being supported by frame portion 126A while detector 152C is illustrated as being supported by frame portion 126B, this relationship may be reversed.

Emitter detector pairs 134D and 134E are similar to one another except that pairs 134D and 134E are supported by frame portions 126A and 126B, respectively. Pair 134D comprises emitter 150D and detector 152D, both of which are received within or built in cavities 156D in frame portion 126A. Emitter 150D emits a beam 154D towards the region proximate to ground engaging member 30. As shown by FIG. 3, when a sufficiently sized accumulation 170 is adhering to ground engaging member 30, beam 154D bounces or reflects off of accumulation 170 and is received by detector 134D which outputs signals to electronics 40.

Pair 134E comprises emitter 150E and detector 152E, both of which are received within or built within cavities 156E in frame portion 126B. Such cavities serve to shield and protect emitter pairs 134D and 134E. In other implementations, such pairs 134D and 134E are formed external to frame portions 126A, 126B and are provided with shields. In other implementations, shielding is omitted. As shown by FIG. 3, emitter 150E emits a beam 154E towards the region proximate to ground engaging member 30. As shown by FIG. 3, when a sufficiently sized accumulation 170 is adhering to ground engaging member 30, beam 154E bounces or reflects off of accumulation 170 and is received by detector 134E which output signals to electronics 40. In the example illustrated, pairs 134D and 134E are situated substantially opposite to one another so as to reflect beams off opposite sides of accumulation 170, facilitating a determination of a size of accumulation 170 and/or providing redundancy for monitoring the same region adjacent to ground engaging member 30 should one of pairs 134D and 134E become blocked or otherwise malfunctions. In other implementations, pairs of emitter-detector pairs may have wavelengths selected to facilitate at least one of analysis or identification of accumulated material via differences in beam attenuation or reflection. In one example, pair 134D employs a near infra-red wavelength while pair 134E employs a red wavelength. The relative reflectance at each wavelength may be used to calculate a Normalized Difference Vegetation Index (NDVI) to distinguish between plant and soil accumulation.

In the example illustrated, system 120 is illustrated as comprising each of such emitter detector pairs 134. In other implementations, system 120 may include less than each of the pairs 134 illustrated. Although some of pairs 134 have been emitter and/or detector built into frame portions 126 while others do not, in other implementations, some or all of pairs 134 may have one or both of the emitter and the detector be built into frame portions 126 or may be mounted external to frame portions 126. In some implementations, both emitters and detectors of each pair may be behind a shield, such a shield 146 or shield 148. In one implementation, some of pairs 134 may comprise a first type of sensor, such as an infrared emitter-detector pair while other of pairs 134 comprise Gamma ray emitter-detector pairs to provide redundancy accuracy and cost savings.

The emitter and/or detectors of sensors 134 are protected by shielding, either external shielding 146, 148 or by being recessed into a structure, such as frame portions 126A, 126B or ground engaging member 30. In some implementations, such shielding not only protects the emitter and/or detector of each pair 134, but also reduces the likelihood of accumulation adjacent to or on the emitter and/or detector, inhibiting the functioning of the pair 134. In some implementations, the emitter-detector pair is chosen so as to emit a beam of a type which is relatively unaffected by dust, mud or the like or so as to emit a beam with an appropriate intensity so as to pierce any blocking material, material other than accumulation 170.

In other implementations, mechanic and electrical debris mitigating mechanisms are utilized. FIG. 4 schematically illustrates emitter-detector pair 134 which may be employed in place of detector pairs 134D, 134E of system 120. Emitter-detector pair 134F comprises emitter 150F and detector 152F. Emitter 150F and detector 152F each comprise various material buildup mitigation mechanisms to reduce the buildup of dust, mud, debris or other blocking materials that might otherwise obscure or attenuate the beam being emitted or being received.

In the example illustrated, each of emitter 150F and detector 152F comprises a beam channel 172, a channel charging device 174, a pneumatic mitigation mechanism 176, a mitigation coating 178 and/or mechanical wiper 180. Beam channel 172 comprises a tube, channel or other structure through which a beam is emitted from emitter 150F and received by detector 152F. Channel charging devices 174 apply an electrical charge to the exterior of channel 172 which repels the blocking material, such as dust. Pneumatic mitigation mechanism 176 comprises an air supply or air source (AS) which blows pressurized air, or alternatively sucks air, in regions proximate to emitter 150F and detector 152F is to divert blocking material away from emitter 150F and detector 152F. Mitigation coating 178 comprises a coating depositor placed upon the exterior of beam channels 172, wherein the coating repels the blocking material and/or inhibits the buildup of material by causing any material to slide off or fall off under the force of gravity. Examples of such coating may include hydrophilic materials are hydrophobic materials. One example of coating 178 is polytetrafluoroethylene (TEFLON). Mechanical wipers 180 comprise elastomeric, flexible or compressible structures which are mechanically reciprocated across a transparent or translucent surface in front of emitter 150F and detector 152F to clean and remove buildup of blocking material.

Although emitter 150F and detector 152F are illustrated as including each of mitigation mechanisms, in other implementations, emitter 150F and detector 152F include less than each of the mitigation mechanisms described. Each of the illustrated material buildup mitigation mechanisms shown in FIG. 4 may additionally be provided with respect to any of the individual emitters and/or individual detectors of pairs 134 of system 120. In some implementations, the mitigation mechanisms shown in FIG. 4 may be employed in conjunction with the shielding structure shown in FIG. 3.

FIG. 5 schematically illustrates ground engaging member accumulation determination system 220, an example implementation of ground engaging member accumulation determination system 20. System 220 is similar to system 20 except that system 220 is illustrated as being employed with implement 224 comprising frame portions 226A, 226B, 226C and 226D (collectively referred to as frame portions of 226) and that system 220 is specifically illustrated as comprising an intersecting array or grid of crisscrossing emitter-detector pairs 234A, 234B, 234C, 234D, 234E and 234F (collectively referred to as emitter-detector pairs 234). Those remaining components of system 220 which correspond to components of system 20 are numbered similarly. Although not shown in FIG. 5, system 220 additionally comprises electronics 40 and output device 42 described above.

Frame portions 226 are similar to frame 26. Frame portions 226 extend on multiple opposing sides or portions of ground engaging member 30, facilitating location of sensors 234 on opposite sides of or spaced about multiple sides of ground engaging member 30. Although pairs 234 are illustrated as being mounted externally to such frame portions 226, in other implementations, pairs 234 are alternatively recessed and shielded at least partially within such frame portions 226.

As shown by FIG. 5, pairs 234 transmit and receive beams 254A-254F that crisscross about two or more sides of ground engaging member 30. The crisscrossing of beams about ground engaging member 30 facilitate the detection of accumulations upon multiple opposing or differently facing surfaces of ground engaging member 30. In addition, because system 220 provides multiple beams for individual sides of ground engaging member 30, system 220 provides monitoring redundancy to identify accumulations despite the blockage or malfunctioning of an emitter-detector pair. The multiple beams on individual sides of ground engaging member 30 further facilitates the output of signals to estimate or determine the extent to which ground engaging member 30 is covered with an accumulation as well as the size of such an accumulation. Although system 220 is illustrated as comprising four pairs 234A-234D in one dimension and two emitter-detector pairs 234E and 234F in another dimension perpendicular to the first dimension, in other implementations, system 220 may comprise a greater or fewer of such pairs in each of the two perpendicular dimensions. In yet other implementations, additional emitter-detector pairs are provided in yet a third dimension (into and out of the page) for enhanced accumulation detection. Although each of the emitter-detector pairs 234 of system 220 are illustrated as being transmissive pairs, the beam passing directly from emitter to a detector; in other implementations, one or more of the pairs 234 may alternatively comprise a reflective emitter-detector pair similar to pairs 134A and 134E, 134F described above with respect to system 120.

Figure 6:
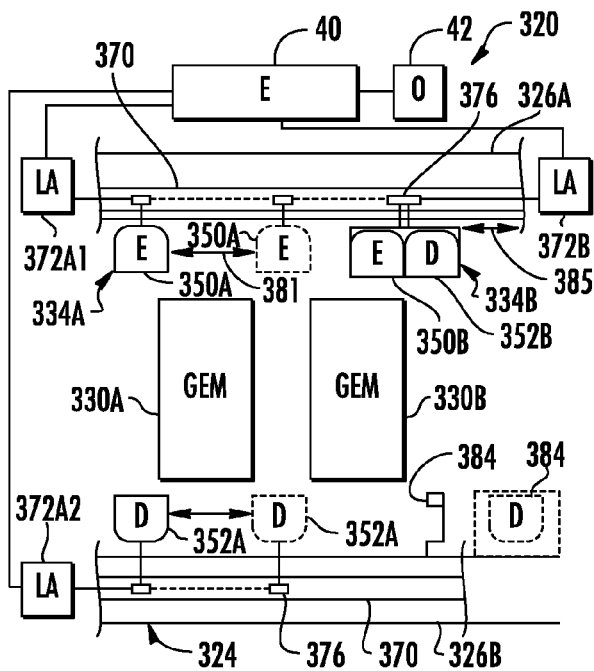
FIG. 6 is a schematic diagram illustrating another example ground engaging member accumulation determination system.

FIG. 6 schematically illustrates ground engaging member accumulation determination system 320, another example implementation of system 20. System 320 is similar system 20 except that (1) system 320 is specifically illustrated as monitoring sensing or accumulations on two ground engaging members 330A, 330B supported by one or more frame portions 326A, 326B of an implement 324 and (2) system 320 comprises emitter-detector pairs 334A, 334B, tracks 370 and linear actuators 372A1, 372A2 and 372B.

Emitter-detector pair 334A comprises emitter 350A and detector 352A, both of which are movably supported along and by associated tracks 370. Tracks 370 extend along frame portions 326A and 326B. In one implementation, tracks 370 comprise channels or grooves along which tongues 376 slide or roll with the assistance of a low friction surface along an interior of tracks 370 or roller bearings. Tongues 376 are slidably or rollably supported within tracks 370 and project from tracks 370 to support emitter 350A, detector 352A and emitter-detector pair 334B.

Linear actuators 372A1 and 372B1 comprise linear actuators operably coupled to emitter 350A and detector 352A, respectively, to move emitter 350A and detector 352A along and within tracks 370. In one implementation, linear actuators 372A1 and 372A2 are synchronized to move emitter 350A and detector 352A in synchronization or unison with one another so as to maintain emitter 350A and detector 352A in alignment opposite to one another.

As shown by the broken lines in FIG. 6, in response to control signals from electronics 40, linear actuators 372A1 and 372A2 reciprocate emitter 350A and detector 352A in directions as indicated by arrows 381. In one implementation, electronics 40 generates control signals to selectively position pair 334A at different locations with respect to ground engaging member 330A or adjacent to ground engaging member 330A. In one implementation, electronics 40 generates control signals causing linear actuators 372A1 and 372A2 to continuously, repeatedly or periodically scan across opposite sides of ground engaging member 330A. In one implementation, electronics 40 generates control signals to selectively reposition one or both of emitter 350A and detector 352A based upon the signals being received or in response to manual input by an operator or manager. Because linear actuators 372A1 and 372A2 selectively reposition emitter 350A and detector 352A, system 220 monitors different surface portions of ground engaging member 330A with a single emitter-detector pair 334A.

In addition, in circumstances where one or both of emitter 350A and detector 352A becomes blocked, electronics 40 may generate control signals causing linear actuators 372A1 and/or 372A2 to move one or both of emitter 350A and detector 352A to either move out of a position in which the emitter detector is blocked or so as to dislodge any blockage of the emitter and/or detector. In one implementation, one or both of frame portions 326 may support wiper blades, such as the example illustrated wiper blade 384, wherein linear actuators 372A1, 372A2 move emitter and/or detector across and relative to the wiper blade to clean the emitter and/or detector. In one implementation, linear actuators 372A1 and 372A2 move one or both of the emitter and detector to within a base enclosure or storage station, such as the illustrated example storage station 386, when not in use. Storage station 384 comprises an enclosure that shields and protects emitter and/or detector when not in use. In one implementation, the storage station 384 includes additional cleaning, blowing or wiping mechanisms which clean the emitter and/or detector when reciting therein.

Emitter-detector pair 334B and linear actuator 372B or similar to emitter-detector pair 334A and linear actuator 372A1 except that pair 334B comprises emitter 350B and detector 352B, both of which are supported by a single tongue 376 riding along a single track 370. Emitter-detector pair 334B is similar to emitter-detector pairs 134D, 134E described above in that pair 334B relies upon reflective sensing.

Linear actuator 372B is similar linear actuator 372A1. Linear actuator 372B selectively positions pair 334B with respect to ground engaging member 330B. In one implementation, linear actuator 372B repeatedly, continuously or periodically reciprocates pair 334B in the directions indicated by arrows 385 back and forth across opposite surfaces of ground engaging member 330B. As a result, pair 334B and linear actuator 372B facilitate monitoring of multiple regions or surfaces of ground engaging member 330B with a single emitter-detector pair.

In one implementation, each of linear actuators 372A1, 372A2 and/or 372B comprise hydraulic or pneumatic cylinder-piston assemblies. In yet another implementation, each of linear actuators 372A1, 372A2 and/or 372B comprise electric solenoids. In still another implementation, each of linear actuators 372A1, 372A2 and/or 372B comprise a motor, such as a stepper motor, operably coupled to the tongues 376 and/or emitter-detector pairs 334A, 334B by a transmission that converts rotary motion to linear motion, such as a belt and pulley or chain and sprocket mechanism, wherein the emitter-detector pair is carried and reciprocated by the driven belt or driven chain.

Although system 320 is illustrated as utilizing emitter-detector pair 334A for monitoring ground engaging member 330A and as utilizing emitter-detector pair 334B for monitoring ground engaging member 330B, in other implementations, emitter-detector pairs 334A, 334B are reciprocated along paths such that each of pairs 334A, 334B monitors both ground engaging member 330A and ground engaging member 330B. As a result, the frequency at which different portions of ground engaging members 330A and 330B are monitored is increased. Moreover, reliability is enhanced in circumstances where one of pairs 334A or 334B is temporarily blocked by dust or other blocking material (not accumulations on ground engaging member). In still other implementations, one of pairs 334A, 334B may alternatively be omitted, wherein two or more ground engaging members are monitored by a single emitter-detector pair being reciprocated back and forth across or between each of the multiple ground engaging members. In yet other implementations, system 320 additionally or alternatively selectively repositions or reciprocates an emitter-detector pair similar to emitter-detector pair 134C or 134F described above.

Figure 7:
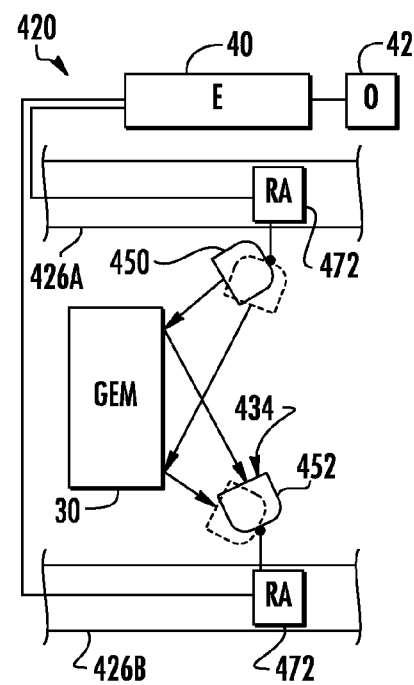
FIG. 7 is a schematic diagram illustrating another example ground engaging member accumulation determination system.

FIG. 7 schematically illustrates ground engaging member accumulation determination system 420, another example implementation of system 20. System 420 is similar system 20 except that system 420 except that (1) system 420 is specifically illustrated as comprising frame portions 426A, 426B and (2) system 420 comprises emitter-detector pair 434 and rotational actuators 472. Frame portions 426A, 426B extend on opposite portion of ground engaging member 30 and rotatably support portions of emitter-detector pair 434.

Emitter-detector pair 434 comprises emitter 450 and detector 452, both of which are pivotably supported along and by frame portions 426A and 426B, respectively. Although illustrated as being pivotably supported external to frame portions 426A, 426B, in other implementations, emitter 450 and/or detector 452 are alternatively positioned behind a shield, similar to shield 146 or 148 (described above respect to FIG. 3) or are rotatable or pivotable while being recessed within a portion of frame portion 426A, 426B.

Rotational actuators 472 comprise mechanisms operably coupled to the emitter 450 and detector 452 so as to selectively rotationally reposition emitter 450 and detector 452. In one implementation, each of rotary actuators 472 comprises a motor, such as a stepper motor, operably coupled to an associated emitter 450 and detector 452. In yet another implementation, each of rotary actuators 472 comprises a linear actuator, such as a hydraulic or pneumatic cylinder-piston assembly or an electric solenoid operably coupled to an associated emitter 450 and detector 452 by a transmission, cam and cam follower arrangement or linkage that converts linear motion to rotary motion.

FIG. 7 illustrates different positions of emitter 450 and detector 452: one position shown in solid lines and an alternative position shown in broken lines. As shown by FIG. 7, rotational actuators 472, in response to or under the control of signals from electronics 40, selectively rotationally reposition emitter 450 and detector 452 relative to one another and to ground engaging member 30 to monitor different regions or volumes of or along ground engaging member 30. In one implementation, electronics 40 generates control signals causing rotational actuators 472 to continuously, repeatedly or periodically scan across an entire surface of ground engaging member 30. In one implementation, electronics 40 generates control signals to selectively reposition one or both of emitter 450 and detector 352 based upon the signals being received or in response to manual input by an operator or manager. Because rotational actuators 472 selectively reposition emitter 450 and detector 452, system 420 monitors different surface portions of ground engaging member 30 with a single emitter-detector pair 434. In addition, in circumstances where one or both of emitter 450 and detector 452 becomes blocked, electronics 40 may generate control signals causing rotational actuators 472 to rotate one or both of emitter 450 and detector 452 to either move out of a position in which the emitter and/or detector is blocked or so as to dislodge any blockage of the emitter and/or detector. In another embodiment, the emitter scanning effect may be implemented using a fixed array of emitters which are selectively activated. In another embodiment, the scanning detector effect may be implemented using a fixed array of detectors. Arrays may be linear or two dimensional.

Although system 420 is illustrated as comprising a single pair 434, in other implementations come system 420 may include additional emitter-detector pairs. Although system 420 is illustrated as comprising an emitter-detector pair 434 is similar to emitter-detector pair 134C described above with respect to FIG. 3, in other implementations, system 420 may additionally or alternatively comprise emitter-detector pairs similar to emitter-detector pair 134A or 134D, 134E described above. In some implementations, in addition to being selectively rotationally reposition, emitter 450 and detector 452 or additionally linearly reciprocated relative to ground engaging member 30. For example, in one implementation, rotary actuator 472 and the associated emitter 450 or associated detector 452 are carried by or supported by tongue 376 which is slidably or rollably supported within a track 370 and linearly reciprocated or moved by a linear actuator 372A1, 372A2 or 372B as described above with respect to system 320. In such an implementation, electronics 40 generates control signals selectively adjusting both a linear position and an angular position of one or both of the emitter and the detector of each emitter-detector pair. In yet other implementations, the angular position of one or both of emitter 450 and detector 452 is automatically adjusted in response to or based upon the linear position along track 370.

Figure 8:
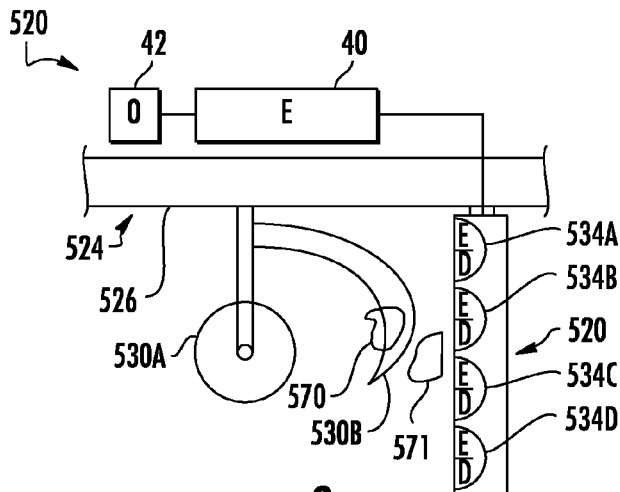
FIG. 8 is a schematic diagram illustrating another example ground engaging member accumulation determination system.

FIG. 8 schematically illustrates ground engaging member accumulation determination system 520, another example implementation of system 20. System 420 is illustrated as being employed with an example implement 524 comprising frame 526 and ground engaging members in the form of disk blade 530A and chisel 530B. Frame 524 is similar to frame 24 in that frame 524 is configured to be pulled, pushed or movably mounted to a vehicle, such as a tractor. In the example illustrated, frame 524 is coupled to a hitch (not shown) facilitating pulling of implement 524 by a vehicle. Frame 524 additionally supports disk blade 530A and chisel 530B. Disk blade 530A and chisel 530B interact with the underlying soil. During such interaction, accumulations 570, such as soil, debris, plant residue, trash and the like, may build up upon chisel 530B as well as disk 530A. As the accumulation gains in size, density and/or mass, the accumulation eventually breaks off of the ground engaging member, such as ground engaging member 530B, in the form of soil chips 571.

System 520 senses and detects accumulation 570 of soil chips 571 behind the ground engaging members 530A and 530B. System 520 comprises sensors 534A, 534B, 534C and 534D (collectively referred to as sensors 534) arranged in a vertical array. Sensors 534 output signals based upon a vertical density of accumulation 570. Because sensors 534 are arranged in a vertical array, system 520 determines the material distribution of accumulation 570 which may impact actions by output device 42, such as whether implement 524 should be raised to allow the accumulation to pass or whether movement of the implement should be paused to allow a person to remove the buildup.

In the example illustrated, system 520 is further configured to discern or distinguish between residue or accumulation 570 building up upon the ground engaging member, such as ground engaging member 530B, and soil chips 571 being thrown by the ground engaging member, such as disk plate 530A or chisel 530B. In one implementation, system 520 distinguishes between built-up accumulation and thrown soil chips based upon a vertical position, frequency and/or duration of blockage detected by sensors 534. In another implementation, soil chips are distinguished from plant material based on attenuation or reflection of light at one or more wavelengths. In one implementation, output device 42 stores parameters of the soil chips, such as their size and density and links the size and size or density to the particular location in which the soil chips land or reside. In one implementation, output device 42 retrieves geo-referencing data from a geo-referencing data source such as a global positioning system using a global navigation satellite system (GNSS) sensor. In one implementation, output device 42 generates and stores a map identifying the location of the soil chips and their size. The generated map is subsequently used for crop or field management either as a result of consultation by an operator or manager or by consultation by a controller which automatically generates control signals adjusting operation of an implement, the application of herbicide, insecticide or fertilizer or adjusts the operation of the vehicle pulling implement based upon such mapped soil chip data.

In the example illustrated, each of sensors 534 comprises an emitter-detector pair. In the example illustrated, each of sensors 534 utilizes an emitter-detector pair that produces output in response to the receipt of a reflected beam. In other implementations, each of sensors 534 may comprise other types of sensors or may be arranged in both vertical and horizontal arrays. In yet other implementations, sensors 534 may be supported by implement 524 at other locations.

Figure 9:
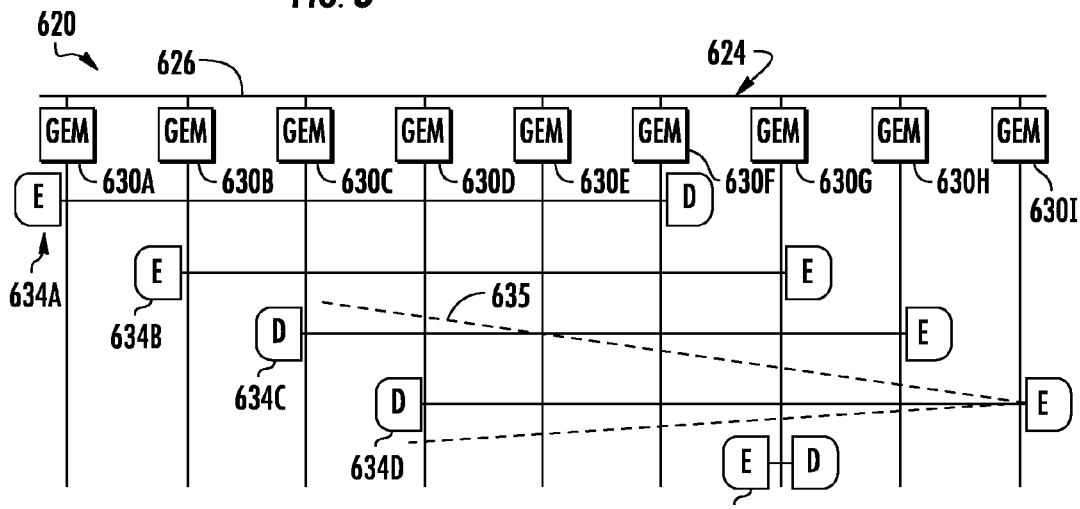
FIG. 9 is a schematic diagram illustrating another example ground engaging member accumulation determination system, wherein emitter-detector pairs are staggered across multiple ground engaging members in a first dimension.

FIG. 9 schematically illustrates ground engagement member accumulation determination system 620, another example of system 20. System 620 is similar to system 20 in that system 620 is for use with an implement 24 having frame 26 supporting ground engaging members 630A, 630B, 630C, 630D, 630E, 630F, 630G, 630H and 630I (schematically shown) (collectively referred to as ground engaging members 630) spaced from one another in a horizontal plane. For example, in one implementation, ground engaging members 630 may be arranged in a horizontally extending row of ground engaging members.

System 620 comprises electronics 40 and output device 42. In the example illustrated, system 620 comprises a staggered array of emitter-detector pairs 634A, 634B, 634C, 634D and 634E (schematically shown) (collectively referred to as emitter-detector pairs 634). Each emitter-detector pair 634 comprises an emitter E and a detector D. As shown by FIG. 9, each of emitter-detector pairs 634 is supported by frame 626 and is spaced across a different subset of the ground engaging members 630, wherein each subset includes a plurality of such ground engaging members 630. In the example illustrated, each emitter detector pair 634 is illustrated as comprising a straight beam detector in which a beam from each emitter is focused or directed upon a single corresponding and opposing detector. In other implementations, as indicated by broken lines 635, one or more of the emitters of emitter-detector pairs 634 alternatively comprises a single emitter E that emits or casts a wide array of electromagnetic radiation, wherein the wide array of electromagnetic radiation emitted from the single emitter E is detected by multiple corresponding, but staggered, detectors D. In such implementations, some of emitters E may be omitted.

Figure 9A:
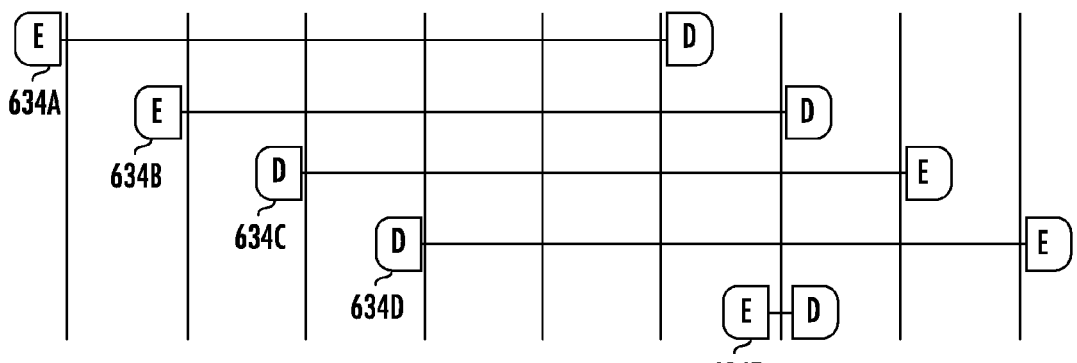
FIG. 9A is a schematic diagram of the ground engaging member accumulation determination system of FIG. 9 illustrating staggering of the emitter-detector pairs in a second dimension.

In one implementation, in addition to being staggered across multiple ground engaging members 630 in a first dimension, the emitters and their associated detectors are also staggered in a second different dimension. For example, in one implementation, the emitter-detector pairs are vertically staggered or offset from one another so as to emit beams or electromagnetic radiation arrays in a transverse direction across a front edge, a rear edge or periphery of the ground engaging members 630 such that the provision of the staggered emitters and detectors do not physically interfere with one another. FIG. 9A illustrates the vertical staggering of emitter-detector pairs 634. In another implementation, the emitter-detector pairs are horizontally staggered or offset in a longitudinal fore-aft direction along a front, rear or other peripheral surface of the ground engaging members being monitored. In yet another implementation, the emitters and their associated detectors are offset from one another in a vertical direction or in a transverse direction while emitting beams or electromagnetic radiation arrays in a longitudinal or fore-aft direction along the side or sides of ground engaging members 630 so as to avoid physical interference with one another.

Electronics 40 (shown in FIG. 1) utilizes signals from the multiple spaced pairs to determine which particular ground engaging member 630 or group of ground engaging members 630 are experiencing accumulation. For example, if signals from pair 634A indicated blockage but signals from pair 634 do not indicate a blockage, electronics 40 is configured to conclude that the blockage is occurring at ground engaging member 630A. The staggering of emitter-detector pairs 634 across multiple different subsets of ground engaging members of 630 facilitates a monitoring of multiple ground engaging members arrive 630 across multiple rows or regions of the implement 624 without an emitter-detector pair being dedicated for each and every row unit a region of implement 624. In addition, the staggering of emitter-detector pairs 634 provides redundancy such that should one of pairs become blocked or malfunctions, the ground engaging member 630 may continue to be monitored. In the example illustrated, system 620 is illustrated as providing redundancy for ground engaging member 630G. In other implementations, redundancy may be provided for other ground engaging members 630 as well.

Figure 10:
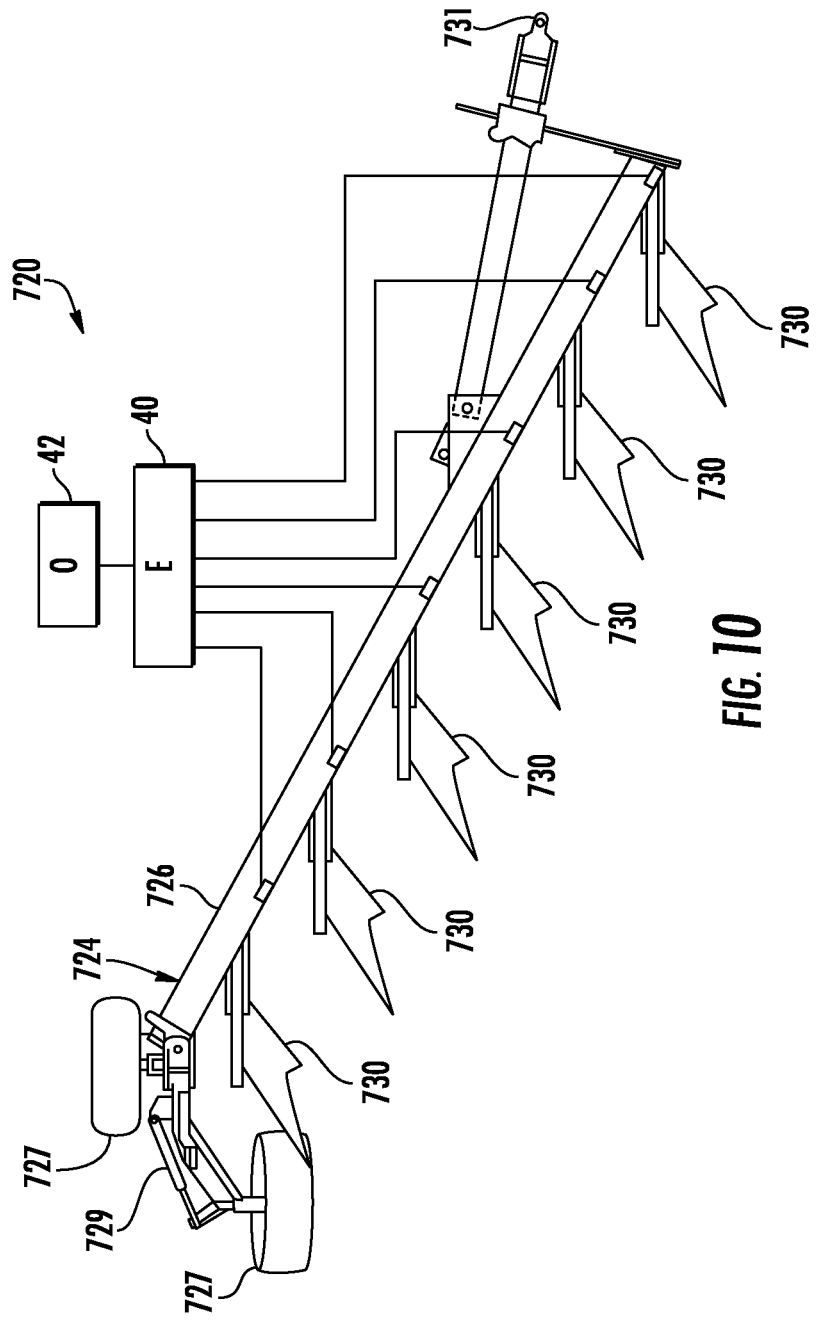
FIG. 10 is a schematic diagram illustrating another example ground engaging member accumulation determination system utilized with respect to an example implement.

FIG. 10 illustrates ground engaging member accumulation determination system 720, another example implementation of system 20. System 720 is similar to system 20 except that system 720 is specifically illustrated as being utilized in conjunction with implement 724 (shown as a mold board plow). Implement 724 comprises frame 726, ground supporting members 727 (in the form of tires), actuators 729 forming part of output device 42, ground engaging members 730 (shown as mold boards) and hitch 731. Frame 726 comprises an arrangement of structures supporting ground engaging members 730. Ground supporting members 727 movably support frame 726 above the ground. Actuators 729 facilitate raising and lowering of frame 726 and ground engaging members 730. In the example illustrated, actuators 729 comprise a hydraulic cylinder-piston assemblies. Actuators 729 are part of output device 42, wherein mold boards 730 are raised and lowered based upon determinations made regarding accumulation upon ground engaging members 730. Hitch 731 facilitates releasable connection of implement 724 to a vehicle, such as a tractor, facilitating pulling of implement 724.

System 720 is similar to system 20 in the system 720 comprises a sensor assigned to each of ground engaging members 730. As with system 20, system 720 comprises electronics 40 and output device 42 described above. In one implementation, electronics 40 and output device 42 are both supported and carried by implement 724. In yet other implementations, implement 724 includes a transceiver for communicating in a wired or wireless fashion with electronics 40 located on the vehicle pulling, pushing or carrying implement 724 or located at a site remote to both implement 724 and the associated vehicle.

In the example illustrated, system 720 comprises sensors 734A, 734B, 734C, 734D, 734E and 734F (collectively referred to as sensors 734). Each of sensors 734 is mounted to or partially recessed within frame 726 on a forward or front side of each ground engaging member 730. Each of sensors 734 is focused or located so as to monitor a region or volume adjacent to ground engaging surfaces of ground engaging members 730. In one implementation, each of sensors 734 comprises an emitter-detector pair. In one implementation, each of sensors 734 comprises an emitter-detector pair such as pairs 134A, 134B, 134C, 134D, 134E or 134F described above. In other implementations, system 720 alternatively comprises an arrangement of sensors such as described with respect to system 620, system 320, system 420 and/or system 520 described above.

FIG. 11 illustrates ground engaging member accumulation determination system 820, another example implementation of system 20. System 820 is similar to system 20 except that system 820 is specifically illustrated as being utilized in conjunction with implement 824 (shown as a chisel plow). Implement 824 comprises frame 826, ground supporting members 827 (in the form of tires), actuators 829 forming part of output device 42, ground engaging members 830 (shown as tines) and hitch 831. Frame 826 comprises an arrangement of structures supporting ground engaging members 830. Ground supporting members 827 movably support frame 826 above the ground. Actuators 829 facilitate raising and lowering of frame 826 and ground engaging members 830. In the example illustrated, actuators 829 comprise a hydraulic cylinder-piston assemblies. Actuators 829 are part of output device 42, wherein ground engaging members 830 are raised and lowered based upon determinations made regarding accumulation upon ground engaging members 830. Hitch 831 facilitates releasable connection of implement 824 to a vehicle, such as a tractor, facilitating pulling of implement 824.

System 820 is similar to system 20 in that system 820 comprises a sensor assigned to each of ground engaging members 830. As with system 20, system 820 comprises electronics 40 and a device 42 described above. In the example illustrated, system 820 comprises sensors for each ground engaging member 830 or group of ground engaging members 830. Each of sensors 834 is mounted to or partially recessed within frame 826 on a forward or front side of each ground engaging member 830. Each of sensors 834 is focused or located so as to monitor a region or volume adjacent to ground engaging surfaces of ground engaging members 730. In one implementation, each of sensors 834 comprises an emitter-detector pair. In one implementation, each of sensors 834 comprising an emitter-detector pairs such as pairs 134A, 134B, 134C, 134D, 134E or 134F described above. In other implementations, system 820 alternatively comprises an arrangement of sensors such as described with respect to system 620, system 320, system 420 and/or system 520 described above.

FIG. 12 schematically illustrates ground engaging member accumulation determination system 920, another implementation of system 20. System 920 similar to system 20 except that system 920 is specifically illustrated as comprising heterogeneous sensor fusion. As shown by FIG. 12, system 920 comprises multiple emitter-detector pairs 934A, 934B, 934C and 934D (collectively referred to as emitter-detector pairs 934) supported by frame portions 26A and 26B of implement 924 so as to monitor regions or volumes about ground engaging member 30. Two or more of the emitter-detector pairs 934 comprise distinct types of sensors. For example, in one implementation, emitter-detector pairs comprise different types of infrared emitter-detector pairs using transmissive or reflective sensing. In one implementation emitter-detector pairs comprise infrared emitter-detector pairs and Gamma ray emitter-detector pairs. In yet other implementations, emitter-detector pairs 924 comprise yet other types of sensors.

The multiple emitter-detector pairs assigned are associated with ground engaging member 30 to monitor the same regions about ground engaging member 30 to provide redundancy for reliability in situations where one of such pairs may become blocked by dust or other material. Emitter-detector pairs 934C and 934D each utilize reflective sensing, wherein emitted beams are reflected off of accumulation. Because pairs 934C and 934 are mounted on opposite sides of the monitor volume, "common mode" blocking events are reduced to provide enhanced monitoring in dusty conditions.

FIG. 13 schematically illustrates ground engaging member accumulation determination system 1020, another implementation of system 20. System 1020 utilizes signals from sensors on implement 1024 as well as sensors directly carried by vehicle 1025 (shown as a tractor). In the example illustrated, system 1020 comprises emitter-detector pairs 1034A, 1034B, 1034D and 1034E (collectively referred to as emitter-detector pairs 1034) carried or supported by implement 1024 for monitoring ground engaging members 1030. System 1020 further comprises vehicle or tractor sensors 1037, which face parallel to the direction of travel 1039 of vehicle 1025. Signals from sensors 1034 are combined with signal from sensors 1037, which extend perpendicular to the direction of travel 1039. As a result, the combined data provided by sensors 1034 and 1037 provide a three-dimensional perspective of material buildup 1070 on ground engaging members 1030.

In one implementation, sensors 1034 comprise any one of emitter-detector pairs 134A, 134B, 134D, 134E and 134F shown described above with respect System 120. In other implementations, system 1020 alternatively comprises an arrangement of sensors such as described with respect to system 620, system 320, system 420 and/or system 520 described above. In one implementation, sensors 1037 comprise optical sensors such as cameras or LIDAR sensors. In yet other implementations, sensors 1037 may comprise other types of sensing devices.

Figure 14:
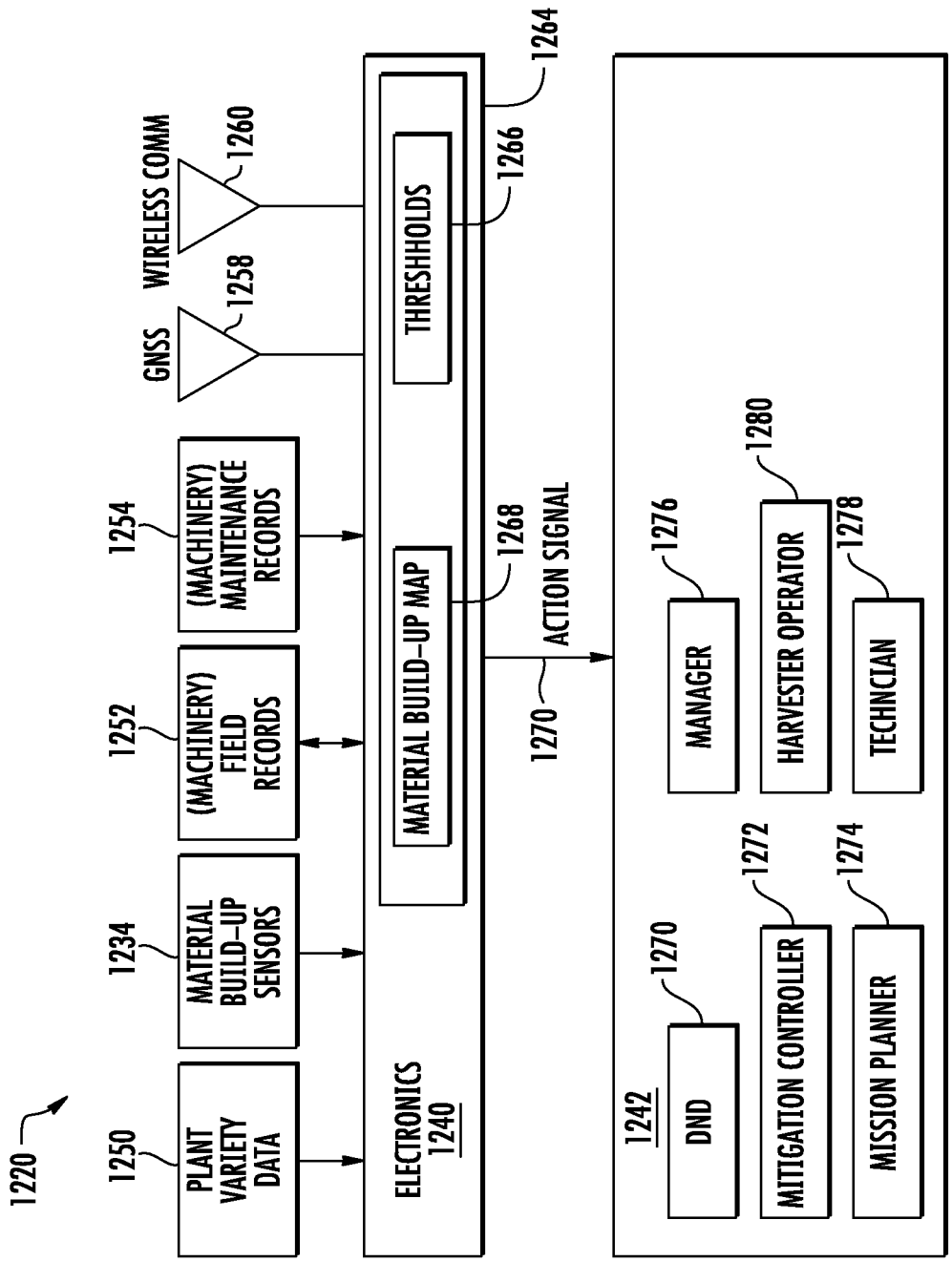
FIG. 14 is a schematic diagram illustrating another example ground engaging member accumulation determination system.

FIG. 14 is a schematic diagram of ground engagement accumulation determination system 1220, another example of system 20. System 1220 comprises material buildup sensors 1234, electronics 1240 and output device 1242. System 1220 additionally comprises plant variety data 1250, field records 1252, machinery maintenance records 1254, GNSS input 1258 and wireless communications 1260.

Sensors 1234 comprise sensors to detect or sense the buildup of accumulation or material on ground engaging members 30 of an implement or on the ground behind such ground engaging members 30. In one implementation, sensors 1234 comprise emitter-detector pairs such as the above-described emitter-detector pairs 134A-134F. In other implementations, material buildup sensors 1234 may comprise other types of sensors, such as cameras, force actuated sensors, LIDAR and the like. In one implementation, sensors 1234 are supported by an implement being pulled, pushed or carried by a vehicle. In yet another implementation, sensors 1234 are directly carried by or supported by a vehicle, such as a tractor. In one implementation, sensors 1234 comprise a combination of sensors on both an implement and the vehicle or tractor pulling, pushing or carrying the implement.

Electronics 1240 are similar to electronics 40. In the illustrated, electronics 1240 comprises one or more processing units configured to operate in accordance with instructions provided on a non-transitory computer-readable medium, such as memory 1264. Such instructions direct electronics 1240 to analyze signals received from sensors 1234 and to make determinations regarding accumulations. Instructions further direct electronics 1240 to generate control signals based upon the detected or determined accumulations either on the ground engaging member 34 upon the ground, such as in the form of soil chips. In one implementation, such instructions direct electronics 1240 to retrieve data from other data sources and utilize the other data in combination with the accumulation data to generate maps and generate control signals.

As shown by FIG. 14, electronics 1240 analyze signals from sensors 1234 against predetermined thresholds 1266 in memory 1264. Based upon such comparisons, electronics 1240 identify a severity of detected accumulations or the extent of such accumulations. In the example illustrated, electronics 1240 receives geo-referencing data through GNSS source 1258 and correlates particular ground locations to times in which accumulations above the one or more predefined thresholds 1266 took place to generate a material buildup map 1268 stored in memory 1264. In some implementations, the material buildup map 1268 additionally links data such as plant variety data, field records and machinery maintenance records to the accumulation data. Electronics 1240 utilizes the material buildup map 1268 to generate action signals 1270 for output device 1242.

Output device 1242 is similar to output device 42 described above. Output device 1242 takes action in response to action signals 1270 received from electronics 1240 which are based at least in part upon determined accumulations. In the example illustrated, output device 1242 comprises operator notification device 1270, mitigation controller 1272, mission planner 1274, manager notification device 1276, technician or customer service center 1278 and/or harvester operator 1280. Operator notification device 1270 comprises a visible or audible notification device, such as a display or speaker, by which the operator of the implement and/or the operator of the vehicle mobilizing the implement receives notification regarding the presence of accumulation and/or the extent of such accumulation. In one implementation, operator notification device 1270 may additionally facilitate the presentation of recommended actions to the operator.

Mitigation controller 1272 comprises a controller, provided by electronics such as an application-specific integrated circuit or a processing unit, which in response to receiving action signals 1270, automatically and without user or operator intervention, mitigates the extent of accumulation or the effects of such accumulation. For example, in one implementation, mitigation controller 1272 automatically raises or lowers the ground engaging member or the implement based upon a determined accumulation. In another implementation, mitigation controller 1272 may automatically adjust a speed at which the implement is moving across a field.

Examples of action taken by an operator in response to receiving a notification on operator notification device 172 or by mitigation controller 1272 include, but are not limited to, manually removing accumulated material, activating an onboard material removal device and/or lifting part or all of the implement to allow material flow past the ground engaging member 30 experiencing the accumulation or buildup. In yet other implementations, such actions may additionally or alternatively comprise changing the ground engaging element type, angle, depth or speed.

Mission planner 1274 comprises a device by which future residue management is planned. For example, in one implementation, upon receipt of action signals 1270 indicating accumulations in particular parts of the field, mission planner 1274 may determine and record future tillage parameters or settings for the particular parts of the field. For purposes of this disclosure, the term "tillage" applies to any operation in which the ground is engaged, including seeders and planters. Such mission plans may be for viewing by an operator, facilitating manually made adjustments by the operator or may comprise a script for being read or followed by a processing unit which automatically makes such adjustments. Examples of adjusting the current or future tillage missions include, but are not limited to, changing or time shifting areas to be tilled, inserting an intermediate mission such as waiting, grazing, stalk chopping, residue collection, residue burning, alternate tillage types or chemical application on all or part of the field, changing future tillage equipment type or future operational parameters for tillage implements such as changing ground engaging element angle depth, down pressure and/or changing tractor/implement speed.

For example, cornstalks and leaves often make up about 50% of corn plant mass which is correlated with grain yield. In the fall or during harvest, a combine may create a yield map. When subsequent tillage is started, data analysis of the first tilled fields may indicate that trash buildup on the tillage implement occurred in areas where grain yield was above toward 225 bushels per acre. This relationship may be applied without limitation to other fields. Based upon such determinations, mission planner 1274 makes adjustments such as selecting a particular tillage tool or employing a stalk chopping for field or subfields which have significant areas with grain yield above 225 bushels per acre. In another implementation, mission planner 1274 generates plans or implement/tractor control scripts, such as in the case of autonomous operations, that implement a priori or in situ tillage tool adjustments such as changing angle, depth or speed of the tillage tool or ground engaging member to prevent or mitigate buildup. Such parameter settings are stored as part of a map which is executed by the implement or vehicle based upon the current location of the implement, ground engaging member or vehicle in the field.

In yet another implementation, mission planner 1274 may analyze various residue management options and their associated costs to identify particular operations for cost reduction or profit maximization. For example, mission planner 1274 may consider the costs associated with the option of direct collection of leaves and stalks such as site-specific bailing prior to tillage or the costs associated with the option of direct grazing of animals to remove leaves and stalks prior to tillage. Mission planner 1274 may additionally consider the direct application of an enzyme or other material to expedite plant material breakdown prior to tillage. Utilizing the different accumulation data provided a map 1268, mission planner 1274 produces a crop management plan/mission and/or implement/vehicle controlling computer-readable script for automatically controlling and directing the operation of the vehicle/implement during subsequent operations based upon the current location of the vehicle/implement.

In some implementations, mission planner 1274 additionally utilizes plant variety data 1250 in generating and outputting a crop management plan/mission and/or vehicle/implement operational control script. For example, information obtained from map 1268 to correlate material buildup to plant genetics and chemical treatments. By way of example, Bt corn is resistant to corn rootworm, producing healthier and stronger stalks which are less likely to be cut or broken into smaller pieces during harvest and maybe more likely to accumulate on tillage equipment. In one implementation, mission planner 1274 correlates data on material buildup/accumulation and different plant varieties to output guidance regarding (1) the selection of a variety which minimizes issues for a given tillage tool, (2) the selection of the tillage tool which minimizes issues for a given variety, (3) the development of varieties by seed, having strong stalks to optimize lodging risk (a stronger stock is better) with buildup/accumulation on equipment (a weaker stalk is better) and (4) the development of chemicals or enzymes to expedite decay between harvest and future ground engaging or tillage operations.

In one implementation, mission planner 1274 correlates data from map 1268 to equipment records such as field records 1252 or maintenance records 1254 to identify equipment components in need of service. For example, in one implementation, mission planner 1274 may determine that a particular row is experiencing greater residue accumulation as compared to adjacent rows. In one implementation, mission planner 1274 utilizes such data to identify particular components of equipment which operated on the particular row experiencing accumulation issues, recommending service, such as inspection, adjustment, repair or replacement, of the component. For example, excess accumulation on a particular row may indicate a malfunctioning stalk chopper, disk or coulter component which previously interacted with the particular row.

Manager notification device 1276 and technician notification device 1278 comprise audible, haptic, or visible notifying devices, such as speakers, vibration generators, or displays, by which a manager of farm operations or a customer service center/technician is notified of current or historical material accumulations during tillage operations. Harvester operator 1280 comprises a database consulted by an operator or equipment during harvesting. In response to receiving action signals 1270 based upon detected material accumulations, harvester operator 1280 records and stores the accumulations mapped to particular geo-referenced locations. The mapped information is used by harvester operator 1280 to create a mission plan outlining future harvesting activity settings or parameters at particular geo-referenced locations based upon the accumulation data. Actions taken by harvester operator in response to action signals 1270 include, but are not limited to, adjustments to combine components such as stalk cutters, stalk toppers, stalk rolls, straw spreaders and chemical applicators.

In one implementation, mission planner 1274 and/or harvester operator 1280, based upon detected accumulations at particular portions of the field, prescribe combine settings for future harvest missions in field with similarities, such as crop variety, growing season environment, soils, chemical treatments and the like, as the field in which the accumulations were detected. In some implementations, mission planner 1274 may prescribe future activities such as plant varieties and/or chemical applications for future growing seasons based upon residue buildup issues on equipment in addition to other factors such as yield, environmental stress tolerance and/or other agronomic factors.

Plant variety data source 1250, field records 1252 and machinery maintenance records 1254 comprise records stored in one or more non-transitory computer-readable mediums, persistent storage devices or memory. In one implementation, such data or records are stored in a local memory, on the implement or on the vehicle mobilizing the implement. In another implementation, such data or records are remotely stored in a remote memory, such as data stored in a memory accessible through a server on a local area network or a wide area network.

GNSS input 1258 comprises a source of geo-referencing data for use by electronics 1240 in linking sensed a determined accumulations to particular locations in a field. In other implementations, some 1220 may alternatively utilize other geo-referencing sources. Wireless communication 1260 comprises a device by which system 1220 may wirelessly communicate with external or remote data sources and data recipients. Wireless communication 1260 facilitates retrieval of data from external sources by electronics 1240, such as when plant variety data 1250, field records 1252 or machinery maintenance records 1254 are remotely stored. Wireless communication 1260 further facilitates the transmission of results and control signals, such as action signals 1270, to remote locations or from a vehicle to an implement (or vice versa).

Figure 15:
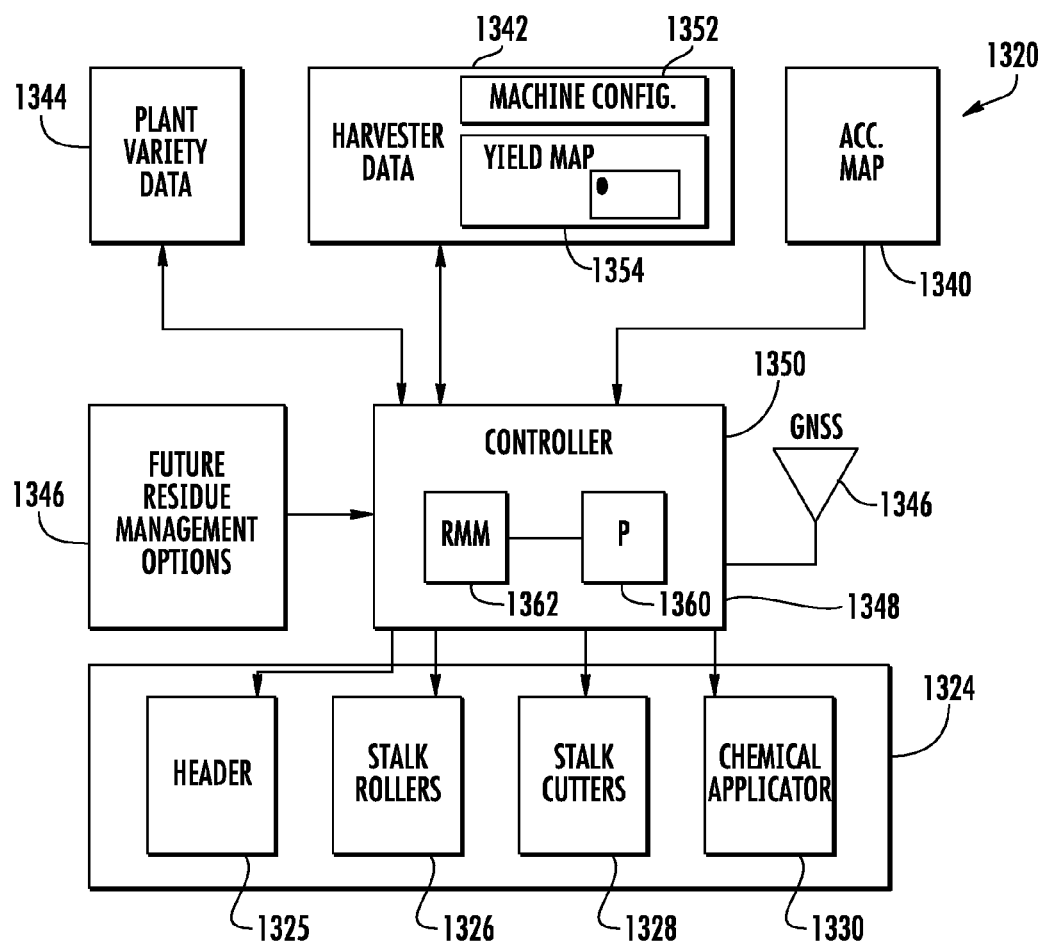
FIG. 15 is a schematic diagram illustrating an example harvester control system which operates based at least in part upon material buildup/accumulation data.

FIG. 15 schematically illustrates an example harvester control system 1320. Harvester control system 1320 is operable in accordance with ground engaging member accumulation data produced and stored by any of systems 20, 120, 220, 320, 420, 520, 620, 720, 820, 920, 1020 or 1220 described above. Harvester control system 1320 comprises a system for controlling and/or adjusting parameters of a harvester based at least in part upon prior accumulation data indicating conditions or portions of field at which a ground engaging member of a tillage implement experienced accumulation and/or based at least in part upon prior recorded locations of soil chips. Harvester control system 1320 is illustrated for use with a harvester 1324 having a header 1325, stalk rollers 1326, stalk cutters 1328 and a chemical applicator 1330. Header 1324 comprises a structure which supports each of the crop interacting components of harvester 1324. Header 1324 has an adjustable height.

Stalk rollers 1326 comprise rollers supporting carried by header 1325, wherein the rollers are configured to draw a plant, such as a corn stock, down through and between stripper plates, whereby the ear of the plant is separated from the stock. Stalk cutters 1328 comprise blades or knives supported by header 1325, wherein the blades or knives cut the plant proximate to the ground. Chemical applicator 1330 comprises a device configured to apply one or more chemicals after the crops have been harvested, wherein the chemicals are chosen so as to facilitate degradation or breakdown of the remaining plant residue in the field. In other implementations, harvester 1324 may omit chemical applicator 1330.

Harvester control system 1320 comprises accumulation map 1340, harvester data 1342, plant variety data 1344, future residue management options 1346, geo-referencing data source 1348 and controller 1350. Accumulation map 1340, also known as a material buildup map, comprises a digitally stored map of a field or other location generated by output device 42, 1242 (described above) and indicating ground locations at which accumulation occurred and locations at which soil chips may be located. System 1320 utilizes data from accumulation map 1340 to generate control signals for adjusting operation of harvester 1324.

Harvester data 1342 comprises additional stored data which is used by system 1320 in combination with accumulation data to adjust harvester 1324. Harvester data 1342 comprises machine configuration data 1352 and yield map 1354. Machine configuration data 1352 comprises stalk sizing and distribution functions available to harvester 1324 such as speed control and position for stalk rollers 1326 as well as presence and control options for stalk cutters 1328, the height of header 1325 and the attributes of chemical applicator 1330. Yield map 1354 comprises a record or map of harvested data such as the amount of grain or crop being harvested at different locations and/or the sensed or determined amount of total biomass yield at particular ground locations. In one implementation, the total biomass yield at a particular location is estimated based upon a sensed a determined crop yield at the location. One implementation, total biomass yield is estimated based upon stalk thickness as determined by various sensors.

Plant variety data 1344 comprises a database of stored data providing information on stalk strength, decay rates of crops and the cutting capabilities of various machine components. Future residue management options 1350 comprises a database providing information such as optimize stock segment length for cattle grazing, tillage tools available for later passes, characteristics of decay-promoting chemical/enzyme applications and the like. Each of accumulation map 1340, harvester data 1342, plant variety data 1344 and future residue management options 1346 are stored in a non-transitory computer-readable medium either local to controller 1350, local to harvester 1324 or remote from harvester 1324 or controller 1350, wherein such data is communicated from a remote server across a local area network or a wide area network.

Geo-referencing data source 1348 comprises a source of geo-referencing data for use by system 1320. In the example illustrated, geo-referencing data source 3048 comprises a GNSS data source. System 1320 utilize data from source 1348 two determine the location of harvester 1324 as harvester 1324 is traversing a field, wherein controller 1350 generates control signals based upon the determined location and based at least in part upon data from accumulation map 1340.

Controller 1350 comprises processor 1360 and residue management module 1362. Processor 1360 comprises one or more processing units which generate control signals following instructions provided by residue management module 1362. Residue mansion model 1362 comprises code or instructions contained are stored within a non-transitory computer-readable medium or memory. Such instructions contained in module 1362 direct processor 1360 to generate control signals adjusting the operation of harvester 1324 based upon data from accumulation map 1340.

In the example illustrated, such adjustment of harvester 1324 is further based upon data from harvester data 1342, plant variety data 1344 and future residue management options 1348. For example, in one implementation, following instructions provided by module 1362, processor 1360 determines the current position of harvester 1344 from source 1348, retrieves data from map 1340 and utilizes machine configuration data 1352, yield map 1354, plant variety data 1344 and/or future residue management options 1348 to adjust operational parameters of harvester 1324 to optimize fuel/energy/chemical costs for stalk/plant cutting or treatment. Such settings are additionally based upon other available options, other than through the use of harvester 1324, such as grazing, bailing, tillage or no till. For example, for certain portions of a field, depending upon biomass yield, controller 1350 may determine that it may be more cost-effective to promote breakdown of crop residue. In such a circumstance, controller 1350 may generate control signals adjusting the operation of stalk roller 1326 to better breakup stalks, such as by adjusting a spacing of stalk rollers 1326, and may adjust the operation of chemical applicator 1330 to apply breakdown enhancing chemicals to the remaining crop residue. In another instance, controller 1350 may determine that it is more cost-effective to graze, bail or otherwise harvest the crop residue. In such different circumstances, controller 1350 may generate different control signals to differently adjust the operational parameters such as a height of header 1325, or the operation of chemical applicator 1330. In case of sugarcane, cutting control may additionally comprise adjusting a topping height as well as a header height.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompasses a plurality of such particular elements.

What is claimed is:

1. An apparatus comprising:
    a multi-row implement comprising:
        a flow by ground engaging member for a first row of the implement, the flow by ground engaging member to cut into soil and project below a surface of ground; and
        a second flow by ground engaging member for a second row of the implement, the flow by ground engaging member to cut into soil and project below a surface of ground;
    a sensor mounted to the implement so as to sense a first volume where soil, residue or trash accumulation is expected to occur proximate the flow by ground engaging member for the first row of the implement;
    a second sensor mounted to the implement so as to sense a second volume where soil, residue or trash accumulation is expected to occur proximate the second flow by ground engaging member for the second row of the implement; and
    electronics to receive signals from the sensor and the second sensor, the electronics to identify soil, residue or trash accumulation in the volume on the flow by ground engaging member and the second flow by ground engaging member based upon the signals and to output signals identifying soil, residue or trash accumulation with a row-by-row resolution based upon the identified accumulation, wherein different soil, residue or trash accumulation results are identified for different rows of the implement.

2. The apparatus of claim 1, wherein the sensor comprises:
    a beam detector to be mounted to the implement; and
    a beam emitter to be mounted to the implement so as to form a beam proximate the ground engaging member, wherein accumulation on the flow by ground engaging member alters detection of the beam by the detector.

3. The apparatus of claim 1 further comprising flow by ground engaging members including the flow by ground engaging member and the second flow by ground engaging member and sensors including the sensor and the second sensor, wherein the sensors comprise emitter detector pairs, each of the emitter detector pairs being spaced across a different subset of the flow by ground engaging members, a subset including a plurality of the flow by ground engaging members.

4. The apparatus of claim 1, wherein the electronics output control signals adjusting a parameter of the sensor based upon the signals.

5. The apparatus of claim 1, wherein the electronics output control signals adjusting a position of the sensor based on the signals.

6. The apparatus of claim 1 further comprising
    a shield carried by the implement adjacent the sensor.

7. The apparatus of claim 1, wherein the implement comprises a structural member and wherein the sensor is at least partially recessed within the structural member.

8. The apparatus of claim 1, wherein the electronics output control signals to adjust an operating parameter of the implement based on the determined accumulation.

9. The apparatus of claim 1, wherein the electronics is further to store data based on the determined accumulation.

10. The apparatus of claim 1, wherein the electronics is further to identify soil chips thrown by the flow by ground engaging member and distinguish soil chips from accumulation on the flow by ground engaging member.

11. The apparatus of claim 1, wherein the electronics is further to determine a distribution of the accumulation on the flow by ground engaging member based upon the signals.

12. The apparatus of claim 1, wherein the processor is further to determine and output different non-zero accumulation amounts on the flow by ground engaging member based upon the signals.

13. The apparatus of claim 1 further comprising a third sensor to be carried by the implement, wherein the electronics is to receive second signals from the third sensor and wherein the identification of accumulation on the flow by ground engaging member is based on the signals from the sensor and the second signals from the third sensor.

14. The apparatus of claim 1 further comprising a third sensor to be carried by the implement, wherein the sensor is of a first type, wherein the third sensor is of a second type different than the first type, wherein the electronics is to receive second signals from the third sensor and wherein the identification of accumulation on the flow by ground engaging member is based on the signals from the sensor and the second signals from the third sensor.

15. The apparatus of claim 14, wherein the sensor comprises an infrared emitter detector pair, and wherein the third sensor comprises a Gamma Ray emitter detector pair the apparatus further comprising a second sensor comprising a Gamma Ray emitter detector pair, wherein the electronics is to receive second signals from the second sensor and wherein the identification of accumulation on the flow by ground engaging member is based on the signals from the sensor and the second signals from the second sensor.

16. The implement of claim 1, wherein the sensors comprise:
    a first sensor of a first type to output signals indicating accumulation on one of the flow by ground engaging members; and a second sensor of a second type different than the first type to output signals indicating accumulation on said one of the flow by ground engaging members.

17. An implement to be pulled by a vehicle, the implement comprising:
   a frame;
   flow by ground engaging members supported by the frame;
   sensors supported by the frame to output signals indicating accumulation,
   wherein the flow by ground engaging members are configured to cut into and part soil while projecting below a surface of the ground,
   wherein the sensors are the sense a volume proximate the ground engaging members where accumulation is expected to occur and wherein the signals indicate accumulation of soil, residue or trash in the volume.

18. The implement of claim 17, where the sensors comprise emitter detector pairs.

19. The implement of claim 17, wherein sensors comprise emitter detector pairs, each of the emitter detector pairs being spaced across a different subset of the flow by ground engaging members, each subset including a plurality of the flow by ground engaging members.

20. A method comprising:
   sensing a volume proximate a flow by ground engaging member that cuts into soil, that projects below a surface of ground and that is carried by an implement, the sensing carried out by using a sensor supported by the implement;
   determining, with electronics, the presence of soil, residue or trash accumulation in the volume and on the flow by ground engaging member based upon signals received from the sensor; and
   outputting, from the electronics, a signal based upon the determination of accumulation on the flow by ground engaging member.

* * * * *